United States Patent Office 3,434,582
Patented Mar. 25, 1969

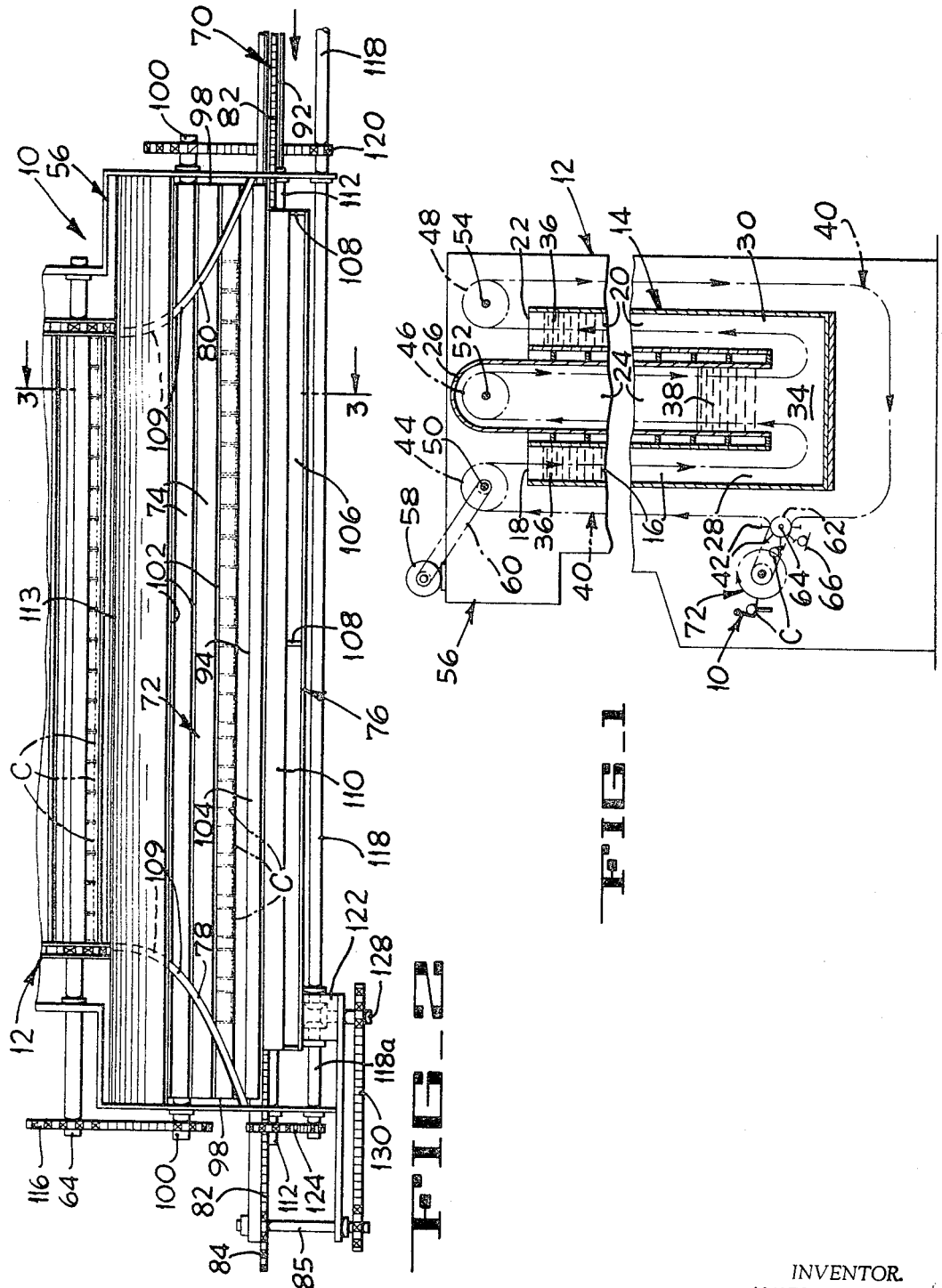

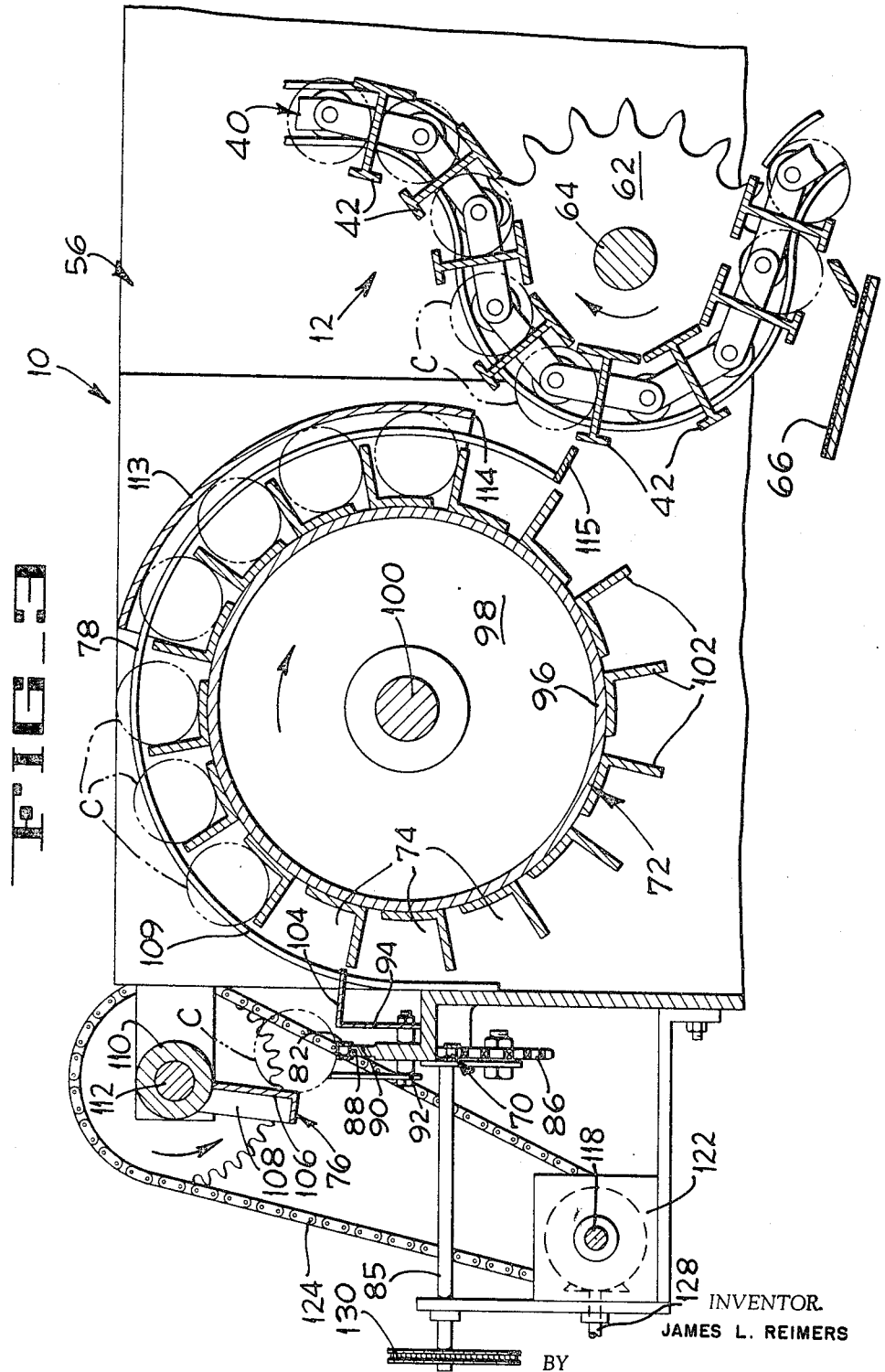

3,434,582
NONSHOCK CONTAINER HANDLING
APPARATUS
James L. Reimers, San Jose, Calif., assignor to FMC
Corporation, San Jose, Calif., a corporation of
Delaware
Filed Jan. 5, 1967, Ser. No. 607,460
Int. Cl. B65g 47/04
U.S. Cl. 198—31                                    15 Claims

ABSTRACT OF THE DISCLOSURE

A container handling apparatus having a conveyor for continuously conveying spaced rows of spaced containers at high speeds in a first direction, a deflecting vane timed with the conveyor for transversely deflecting each moving row of containers off the conveyor, spaced pockets of a continuously driven combining reel for receiving and frictionally stopping the movement in said first direction of each row of spaced containers, and a pair of stationary arcuate plows adjacent opposite ends of the rows of spaced containers for engaging the containers and camming them into sticks of less than a predetermined length before gravitationally discharging the abutting containers into carrier bars of a hydrostatic cooker.

Cross reference to related applications

The subject container handling apparatus is part of a feed system for a hydrostatic cooker of the type illustrated in pending application of Samuel A. Mencacci, Ser. No. 390,880, which issued on Oct. 17, 1967 as Patent No. 3,347,351. Other components of the feed system are disclosed and claimed in the following applications filed on even date herewith and assigned to the assignee of the present invention. These components include a container twisting mechanism disclosed in application of Gardiner, Ser. No. 607,453, and a mechanism for spacing the groups of containers disclosed in the application of Vadas, Ser. No. 607,454.

Background of the invention

This invention pertains to feed systems for hydrostatic cookers and more particularly to an apparatus for gently terminating movement of spaced rows of spaced containers in one direction and thereafter gently centering the spaced containers in each row into sticks of a predetermined length while moving the rows of containers transversely of the one direction into carriers of a hydrostatic cooker.

When processing containers which are about four inches long in hydrostatic cookers at the very high speed of about 450 containers per minute, container spacing and impact difficulties have become apparent in the feed system for the hydrostatic cooker. The impact problem is especially prevalent when handling certain types of jars, for example the well known type of wide mouth baby food jars, which jars cannot stand abrupt end-to-end contact because of the type of sealing compound used on the jar caps. In order to reduce impact and to provide reliable feeding, certain of the individual containers are usually spaced from each other and must also be spaced into fast moving longitudinally extending groups or rows. The containers in each row must then be deflected laterally out of their longitudinal path of movement and be pushed or compacted into a group or row that is shorter than the length of the carrier of the hydrostatic cooker. These last mentioned rows are commonly referred to in the art as "sticks" of containers and the containers in each stick may all be pushed into abutting contact or may have some containers which are spaced from other containers in the stick. These sticks of containers are then aligned with and are deposited into evenly spaced carriers of a continuously moving conveyor which conveyor advances these sticks through the processing mediums in a hydrostatic cooker.

The apparatus for spacing the containers into rows of about 20 containers each has been described and claimed in the above-referred-to Vadas application, and such spacing apparatus feeds the spaced rows of spaced containers to the nonshock container handling apparatus of the present invention.

Summary of the invention

The nonshock container handling apparatus of the present invention transfers each fast moving row of spaced containers transversely from their linear path of movement into one of a plurality of evenly spaced carrier pockets in a continuously rotating reel. This transverse deflection occurs when the row of containers is moving along the linear path and accordingly, their linear movement is gradually stopped by frictional engagement between each container and the wall of the reel pockets thus reducing container impact to a minimum. While advanced by the continuously moving reel around an arcuate path normal to the linear path, stationary cams or plows engage both ends of each row of spaced containers and gently move the containers in each row into a stick of abutting containers, and each stick of containers subsequently gravitate into a carrier of the processing conveyor of the hydrostatic cooker.

Brief description of the drawings

FIGURE 1 is a diagrammatic vertical section of a hydrostatic cooker employing the nonshock container handling apparatus of the present invention, certain parts of the cooker being cut away.

FIGURE 2 is an enlarged diagrammatic plan of the container handling apparatus illustrated in FIGURE 1.

FIGURE 3 is an enlarged vertical section taken along lines 3—3 of FIGURE 2 illustrating a row of containers in position to be deflected off a feed conveyor into a reel, certain parts being cut away.

Description of preferred embodiment

The non-shock container handling apparatus 10 of the present invention is associated with the hydrostatic cooker 12. The hydrostatic cooker 12 (FIG. 1) comprises a housing 14 which defines a vertically elongated inlet chamber 16 having its upper end 18 open to the atmosphere; a vertical elongated discharge chamber 20 having its upper end 22 open to the atmosphere; and a vertically elongated steam chamber 24 having its upper end 26 closed. The lower ends 28, 30, and 32 of the chamber 16, 20 and 24, respectively, communicate with a fluid tight trough 34 defined by certain walls of the housing 14. The steam chamber 24 is filled with steam under pressure, and the inlet chamber 16, discharge chamber 20 and trough 34 are filled with water. As is well known in the art, the super atmospheric pressure of the steam in the steam chamber 24 is balanced by columns of water in the inlet chamber 16 and discharge chamber 20, which columns of water define U-tubes having their upper surfaces at 36 and their lower surfaces at 38. The water in the inlet chamber is usually heated to gradually increase in temperature from its upper end to its lower end, while the water in the discharge chamber 20 is cooled so as to gradually decrease in temperature from its lower end to its upper end.

An endless processing conveyor 40 having a plurality of equally spaced I-beam carriers 42 thereon is trained around spaced pairs of sprockets 44, 46 and 48 mounted on shafts 50, 52 and 54 which are journalled on a frame 56 that supports the housing 14. The conveyor 40 is continuously driven in the direction indicated by arrows in FIGURE 1 by a motor 58 that is mounted on the frame 56 and is connected to the shaft 50 by a chain drive 60.

Sticks of abutting filled and sealed containers C are fed into the carriers 42 at the rate of about 450 cans per minute by the apparatus 10 of the present invention while the carriers 42 move around a sharp curve defined by spaced sprockets 62 keyed to a shaft 64 that is journalled on the frame 56 of the hydrostatic cooker 12. The sticks of containers, with each stick preferably composed of about 20 containers, are then progressively advanced through the chamber 16, 20 and 24 during which time they are first cooked and thereafter cooled. After the sticks of containers have been processed, they are discharged from the processing conveyor onto a take-away conveyor 66.

The non-shock container handling apparatus (FIGS. 2 and 3) of the present invention comprises a feed conveyor 70 which advances spaced rows of spaced containers along a horizontal linear path, an elongated combining reel 72 that is rotated about an axis that is parallel to said linear path and is provided with reel pockets 74, a rotary deflector 76 which deflects the rows of containers laterally off the feed conveyor 70 into adjacent pockets 74 of the reel 72 while the containers C are still moving along the linear path, and stationary arcuate plows 78 and 80 disposed near opposite ends of the elongated reel to engage and cam the spaced containers in each row into gentle end-to-end abutting relationship.

The feed conveyor 70 comprises an endless chain 82 that is trained around a drive sprocket 84 (FIG. 2) keyed to a shaft 85, an idler sprocket 86, (FIG. 3) and other sprockets (not shown). The upper can supporting arm 88 of the chain 82 is slidably supported on a rail 90 that is secured to the frame 56 of the cooker. A container slide plate 92 and an angle slide plate and chute 94 are parallel to and are positioned on opposite sides of the feed conveyor 70 and serve to guide and maintain each row of spaced containers in its linear path until laterally deflected therefrom by the deflector 76.

The reel 72 comprises an elongated drum 96 that has end plates 98 welded thereto and keyed to a shaft 100. A plurality of evenly spaced longitudinally extending angle bars 102 are welded to the drum 96 and cooperate with each other to define a plurality of evenly spaced reel pockets 74. The outer periphery of each reel angle bar 102 moves closely adjacent a downwardly inclined transfer surface 104 of the angle slide plate 94 as clearly illustrated in FIGURE 3.

Each row of containers is transferred into one of the reel pockets 74 by the deflector 76 which comprises a single deflecting vane 106 that is connected by several arms 108 welded to a tube 110. The tube 110 is keyed to a deflector shaft 112 which is journalled on the frame 56. It will be appreciated that each row of spaced containers C is transferred, in turn, into an associated pocket 74 of the reel 72 while they are rapidly moving in a direction parallel to the feed conveyor 70, and that the motion in this direction is gently terminated by frictional sliding engagement of the containers with the surfaces of the deflector vane 106, the transfer surface 104 of the slide plate 94 and the contacted surfaces of the reel angle bars 102. It will be noted that pockets of the reel 72 is in excess of one and one-half times as long as the carriers 42 of the processing conveyor 40 so that the containers are permitted to slide to a stop without permitting the end container to strike an abutment surface.

After the rows of spaced containers have been transferred into the pockets 74 of the reel 72 and have stopped their longitudinal motion caused by the movement of the feed conveyor, the reel advances the end containers C of each row against the associated arcuate plows 78 and 80 which gently cam all of the containers in each row into end-to-end abutting contact thereby forming a stick of containers in each reel pocket 74. Each plow 78 and 80 is in the form of a curved strap 109 that is rigidly secured to the frame 56 of the cooker 12.

As best shown in FIGURE 3, a cylindrical segment 113 is rigidly secured to the frame 56 and surrounds a portion of the reel 72 to prevent the stick of containers from prematurely gravitating from the reel pockets 74. The segment 113 includes a lower edge 114 which terminates at a reel discharge station at which point each stick of containers gravitates out of the associated reel pockets and is guided by a fixed transfer plate 115 into an associated carrier 42 of the processing conveyor 40.

The feed conveyor 70, reel 72 and the rotary deflector 76 are all continuously driven from the motor 58 through the processing conveyor 40 which drives the shaft 64. The shaft 64 is connected to the reel shaft 100 by a chain and sprocket drive 116. The reel shaft 100 is connected to an elongated drive shaft 118 by a chain and sprocket drive 120. The drive shaft 118 has the input shaft of right angle gear box 122 coupled to one end thereof. One output shaft 118a of the gear box 122, which shaft 118a is driven in the opposite direction of the shaft 118 is connected by a chain drive 124 to the deflector shaft 112. The feed conveyor 70 is driven from another output shaft 128 of the gear box 122 by a chain drive 130 which connects the output shaft 128 to the shaft 85 that has the conveyor drive sprocket 84 keyed thereon. Thus, all driven parts of the nonshock carton handling apparatus 10 are driven in timed relation with the processing conveyor 40 of the hydrostatic cooker 12.

From the foregoing description it will be apparent that the nonshock container handling apparatus of the present invention operates at very high container speeds and effects the gentle frictional termination of movement of the fast moving rows of containers in one direction while simultaneously transferring the rows of spaced containers laterally into a combining reel. Plows at both ends of the reel then gently move the ends of each row toward the center thereof to place the containers in each row into abutting contact.

Although in the preferred embodiment of the invention, each complete row of containers deflected off of the feed conveyor is illustrated as including ten spaced containers and ten containers that are in end-to-end abutting contact, it is to be understood that other formations and numbers of containers may be handled by the apparatus. For example, all containers in each row may be contacting each other, or all containers in each row may be spaced from each other as they are deflected off the feed conveyor. Also, the apparatus of the present invention will transfer partial rows, or single containers, and the containers may be supported either on their ends, or on their sides as illustrated.

Alhough the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A nonshock container handling apparatus comprising conveying means for moving a row of spaced containers at high speed in a predetermined direction longitudinally of the axis of said row, means for transferring said row of containers from said conveying means transversely of said axis while said containers are moving in said predetermined direction, and movable transporting means including an elongated carrier disposed parallel to said conveying means for receiving said row of spaced containers from said transferring means and for allowing said row of containers to gently terminate its movement in said predetermined direction by sliding to a stop while at the same time moving transversely from said receiving position toward a discharge position, said elongated carrier being about one and one-half times as long as the predetermined maximum length of a stick of containers whereby frictional resistance between the row of containers and said transferring means and carrier is the sole force which terminates movement of the row in said predetermined direction.

2. An apparatus according to claim 1 and additionally comprising compacting means disposed in position to engage one end of said row of spaced containers and to gently move spaced containers in said row into a stick of less than said predetermined length and with at least two of the containers being disposed in abutting engagement as the row of containers is moving transversely from said receiving position to said discharge position.

3. An apparatus according to claim 1 and additionally comprising compacting means disposed in position to engage both ends of said row of spaced containers and to gently move spaced containers in said row into a stick of less than said predetermined length and with at least two of said containers being disposed in abutting engagement as the row of containers is moved from said receiving position to said discharge position.

4. A nonshock container handling apparatus comprising a continuously driven feed conveyor for advancing a row of containers in a predetermined direction along a linear path, means defining an elongated container compacting pocket disposed parallel to said feed conveyor, pocket carrying means for moving said pocket from a receiving position immediately adjacent said feed conveyor to a discharge position, means for deflecting the row of spaced containers from said feed conveyor into said pocket while the row of containers is moving along said linear path whereby frictional engagement between said pocket defining means and said containers gently terminates movement of the containers in said predetermined direction, compacting means for moving containers in said spaced row of containers into contact as the containers move from said receiving position to said discharge position and after movement induced by said feed conveyor in said predetermined direction has been terminated, an elongated carrier disposed parallel to said feed conveyor for receiving the row of containers from said pocket at said discharge position, conveying means for supporting and moving said elongated carrier past said container compacting pocket at the discharge position, and means for driving said feed conveyor, pocket carrying means, deflecting means, and conveying means in timed relation.

5. An apparatus according to claim 4 wherein said pocket carrying means is a continuously driven reel and wherein a plurality of pocket defining means are mounted at evenly spaced intervals along the periphery of said reel.

6. An apparatus according to claim 4 wherein said elongated carrier is of a predetermined length to accommodate a stick of containers which is less than said predetermined length, and wherein said compacting pocket is at least one and one-half times as long as said elongated carrier so that the spaced row of containers will have ample distance to slide to a stop.

7. An apparatus according to claim 5 wherein said compacting means comprises a pair of stationary plows disposed adjacent said reel in positions to engage opposite ends of the row of spaced containers in said pocket, said plows gradually converging from said receiving position to said discharge position for gently moving the containers in said row into a stick of predetermined length.

8. An apparatus according to claim 4 wherein said deflecting means includes a single deflecting vane mounted for rotation, and wherein said drive means rotates said vane about an axis parallel to said pocket.

9. An apparatus according to claim 5 wherein a chute is disposed between said feed conveyor and said rail; and wherein said deflecting means includes a single deflecting vane mounted for rotation about an axis parallel to said reel axis; frictional engagement between the row of spaced containers and said chute, said vane and said pocket defining means being the sole force for terminating the movement of the containers in said predetermined direction.

10. An apparatus according to claim 4 wherein said conveying means is a processing conveyor for a hydrostatic cooker of the type having evenly spaced carrier bars which open sufficiently to receive and discharge a row of containers therefrom when moving around a sharp curve and which confine the row of containers therein when moving along a linear path.

11. An apparatus according to claim 5 wherein said elongated carrier is of a predetermined length for accommodating a predetermined number of containers, and wherein each of said compacting pocket are at least one and one-half times as long as said elongated carrier so that the spaced row of containers will have ample distance to slide to a stop.

12. An apparatus according to claim 11 wherein said compacting means comprises a stationary plow disposed adjacent said reel in position to engage an end of the row of containers in said pocket, said plow gently urging said containers in said row toward the next adjacent carrier in said row.

13. An apparatus according to claim 11 wherein said compacting means comprises the pair of stationary plows disposed adjacent said reel in position to engage opposite ends of the rows of containers in said pocket, said plows gradually converging from said receiving position to said discharge position for gently moving the engaged containers in said row toward each other.

14. A method of gently handling containers comprising the steps of moving a row of spaced containers at high speed along a path in a predetermined direction longitudinally of the axis of said row, transferring said row of containers from said path in a direction transversely of said axis while said containers are moving in said predetermined direction, terminating movement of the transferred row of spaced containers in said predetermined direction by allowing said row of containers to gently slide to a stop within a space which is about one and one-half times as long as the predetermined maximum length of a compact stick of containers whereby frictional resistance is the sole force which terminates movement of the row in said predetermined direction, and moving the row transversely of said axis while said row is sliding to a stop in said predetermined direction.

15. The method of claim 14 and additionally including the step of engaging both ends of said row of spaced containers after the containers have terminated their movement in said predetermined direction and gently moving the spaced containers in said row into a stick of containers of less than said predetermined length with at least two of said containers being moved into abutting engagement while the row of containers is moving transversely of said axis.

References Cited

UNITED STATES PATENTS

| | | | |
|---|---|---|---|
| 1,090,855 | 3/1914 | Jagenberg | 198—31 |
| 1,650,900 | 11/1927 | Mayers | 198—31 |

FOREIGN PATENTS

| | | |
|---|---|---|
| 123,451 | 6/1931 | Austria. |

EDWARD A. SROKA, *Primary Examiner.*